Patented Nov. 2, 1926.

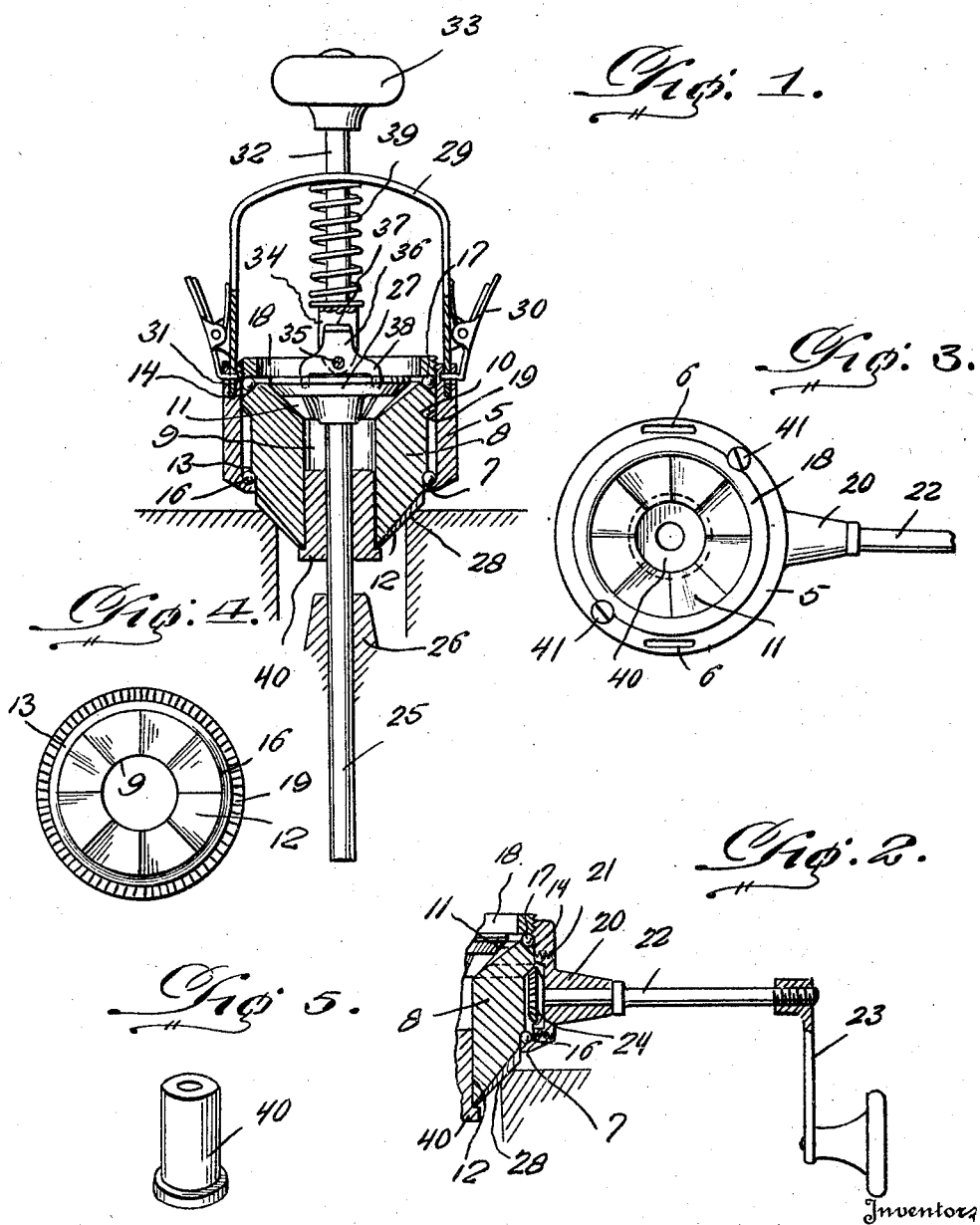

1,604,966

UNITED STATES PATENT OFFICE.

ANDREW BROOKS AND WILLIE L. BROOKS, OF WINNSBORO, LOUISIANA.

ROTARY VALVE REAMER.

Application filed March 14, 1925. Serial No. 15,546.

The present invention relates to a valve reamer of the rotary type, and has for its principal object to provide an efficient tool of this nature, for refacing valves and valve seats, particularly of internal combustion engines.

Another important object of the invention is to provide a reamer of this nature which will reface the valve and the valve seat simultaneously.

Another important object of the invention is to provide a device of this nature, which has a simple structure, one which is reliable in operation, easy to manipulate, not liable to readily get out of order, one which may be quickly assembled and disassembled, one which is strong and durable, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawing:

Figure 1 is a vertical section, through the improved device, embodying features of our invention.

Figure 2 is a fragmentary vertical section, taken at right angles to the section shown in Figure 1.

Figure 3 is a top plan view of the device, with the bail removed.

Figure 4 is a bottom plan view of the reaming block.

Figure 5 is a perspective view of the filling sleeve for the reamer block.

Referring to the drawing in detail, it will be seen that 5 designates a cylindrical body, the upper edge of which is provided with recesses 6 at diametrically opposed points. The bottom edge of the body 5 is turned inwardly to form a brace flange 7. A reamer block 8 is constructed with a longitudinally extending bore 9, and at its upper end with an annular shoulder 10. The upper end of the block 8 is concaved in a frusto-conical manner, while the lower end is convexed, in a frusto-conical manner. The upper end 11 is provided with reaming teeth and is shown in Figure 3, while the lower end 12 is also provided with reaming teeth, as is shown in Figure 4. An annular shoulder 13 is provided on the exterior surface of the block 8, and the upper edge of the shoulder 10 is bevelled as at 14, for forming a race. This block 8 is mounted for rotation in the body 5, and bearings 16 of the spherical or ball type, are disposed on the race flange 7 and engage the shoulder 13. Similar ball bearings 17 are mounted on the bevelled race 14, and a ring 18 is threaded into the upper end of the cylindrical body 5, so as to engage these ball bearings 17. The lower surface of the annular shoulder 10 is in the form of a bevelled gear 19. A bearing 20 is threaded into the body 5, as at 21, and rotatably receives a shaft 22, having a suitable crank 23 on the outer end thereof. A bevelled pinion 24 is disposed on the inner end of this shaft 22, and meshes with the bevelled gear 19.

A conventional valve is illustrated in Figure 1 including the stem 25 projecting downwardly through the guide 26, while the knob proper 27 is seated on the concaved end 11. The convex end 12 is rested on the valve seat 28. An inverted U-shaped bail 29 has its ends inserted in the recesses 6, and is locked in engagement with the body 5, by spring pressed pivoted dogs 30 of the hook type, which project through slots 31 in the body 5, communicating with the recesses 6 transversely thereof. A bar 32 is slidable through the intermediate portion of the bail 29, and the upper end thereof has a retaining knob 33 fixed thereto. A yoke 34 is fixed to the bottom end of the bar 32, and pivotally supports, as at 35, a key 36, having at one end a slot engaging blade 37, and at its other end a pair of depression engaging members 38. Some valves are provided on their upper faces with two spaced depressions, which may be engaged by the member 38, while other valves are provided with slots, and therefore the key 36 would have to be reversed from the position shown in Figure 1, in order that it may be engaged by the blade 37. A spring 39 is coiled about the bar 32, and has one end engaged against the intermediate portion of the bail 29, while the other end is engaged against the yoke 34, so as to hold the key 36, in engagement with the valve 37. A filling sleeve 40 is adapted to be inserted in the bore 9 of the block 8 and the bore of this sleeve should conform in its diameter with the diameter of the particular valve stem 25. In other words, with this tool, there would be provided a set of the filling sleeves 40. A pair of screws 41 are threaded into the upper edge of the body 5, so that the heads may engage the ring 18 and lock the same in engagement with the body.

From the above detailed description, it will be seen that one hand may be engaged upon the knob 33, for preventing the rotation of the bar 32 and the valve proper 27, and the other hand engaged with the crank 23. Upon turning this crank 23, the shaft 22 will be turned, thereby actuating the pinion 24, the gear 19, and rotating the block 8. Since the valve 27 and the seat 28 are stationary, it will be seen that the reamer block will reface the valve and the seat simultaneously.

It will also be noted that the device is capable of being very easily assembled and disassembled, and is easily operated. The present embodiment of the invention, which we have described in detail, attains all of the features of advantage enumerated as desirable, in the statement of the invention and the above description, but it is desired to point out that numerous changes in the details of construction, in the size, in the materials, and in the combination and arrangement of parts may be resorted to, without departing from the spirit or scope of the invention as hereinafter claimed, or sacrificing any of its advantages.

Having thus described our invention, what we claim is:

1. A refacing tool of the class described, including a cylindrical body, a block rotatably mounted in the cylindrical body and being reduced intermediate its ends to provide a beveled shoulder having gear teeth formed thereon, a shaft journaled transversely of the body and having a pinion on the inner end thereof meshing with said gear teeth whereby the rotation of the shaft will cause rotation of the block, the lower face of the block being convexed, the upper face of the block being concaved, both of said faces being of a frusto-conical formation having reamer teeth formed thereon.

2. A refacing tool of the class described, including a cylindrical body, a block rotatably mounted in the cylindrical body, means for rotating the block, said block provided with reamer ends, an inverted U-shaped bail detachably engaged with the upper end of the body, a bar extending through the intermediate portion of the bail and provided with a valve engaging means on its lower end, a knob on its upper end, a spring disposed about the bar between the valve engaging means and the bail, and a sleeve disposed in said block for receiving a valve stem.

In testimony whereof we affix our signatures.

ANDREW BROOKS.
WILLIE L. BROOKS.